US006862565B1

(12) United States Patent
Zheng

(10) Patent No.: US 6,862,565 B1
(45) Date of Patent: Mar. 1, 2005

(54) METHOD AND APPARATUS FOR VALIDATING CROSS-ARCHITECTURE ISA EMULATION

(75) Inventor: Qinghua Zheng, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/548,736

(22) Filed: Apr. 13, 2000

(51) Int. Cl.$^7$ ................................................ G06F 9/455

(52) U.S. Cl. ............................ 703/27; 703/28; 714/28; 714/728; 717/158

(58) Field of Search ............................ 703/27, 28, 26; 714/28, 728, 729; 717/158

(56) References Cited

U.S. PATENT DOCUMENTS

| | | | | |
|---|---|---|---|---|
| 4,841,476 A | * | 6/1989 | Mitchell et al. | ............... 703/26 |
| 5,202,889 A | * | 4/1993 | Aharon et al. | ............... 714/739 |
| 6,009,261 A | * | 12/1999 | Scalzi et al. | .................. 703/26 |
| 6,463,582 B1 | * | 10/2002 | Lethin et al. | ............... 717/158 |
| 6,606,721 B1 | * | 8/2003 | Gowin et al. | ............... 714/728 |

OTHER PUBLICATIONS

Handbook of Simulation, by Jerry Banks, John Wiley & Sons, Inc., Aug. 1998, ISBN 0–471–13403–1, pp. 3, 15–19.*

The Computer Science and Engineering Handbook, by Allen B. Tucker, CRC Press, ISBN: 0–8493–2909–4, 1996, pp. 412–415.*

* cited by examiner

Primary Examiner—Kevin J. Teska
Assistant Examiner—Eduardo Garcia-Otero

(57) ABSTRACT

A method and an apparatus allows complete and efficient verification of cross-architecture ISA emulation. A random verification framework runs concurrently on two different computer architectures. The framework operates without regard to existing native applications and relies instead on binary instructions in a native ISA. The framework determines emulation errors at a machine instruction level. A random code generator generates one or more sequences of native machine instructions and corresponding initial machine states in a pseudo-random fashion. The native instructions are generated from an entire set of the native ISA. The instructions and the state information are provided to initialize a native computer architecture. The same instructions and state information are provided using standard machine-to-machine languages, such as TCP/IP, for example, to a target computer architecture. A binary emulator then translates the native instructions so that the instructions may be executed on the target computer. Alternatively, the binary emulator may be embodied as a software routine operating on a simulator, which in turn operates on the native computer architecture. The final states of the native and the target computer architectures are gathered, and a verification engine compares the results. Any differences may indicate an emulation error or failure. The random verification framework may be run continuously to test emulation of the complete set of instructions from the native ISA after the testing continues for an infinite length of time.

19 Claims, 2 Drawing Sheets

METHOD AND APPARATUS FOR VALIDATING CROSS-ARCHITECTURE ISA EMULATION

TECHNICAL FIELD

The technical field is emulation of computer instruction sets.

BACKGROUND

Cross-architecture emulation is needed when running native applications on a target platform, or computer, that uses an instruction set architecture (ISA) different from the ISA for which the native applications were initially intended. The developer of a cross-architecture emulation product wants to know that the emulator correctly translates or interprets the native applications. Various schemes exist to verify cross-architecture emulation. However, these schemes cannot easily, if at all, comprehensively test the emulation process.

To improve the emulation process, a binary translation product that runs on the target platform may be used to emulate native instructions running on a native, or legacy, platform. Binary translation automatically translates binary code from the native instruction set to binary code for the target platform without the need for high-level source code. As with any emulation product, a developer of the binary translation product may desire to verify the accuracy of emulation from the native ISA to an ISA operating on a target platform.

One conventional approach to verifying cross-architecture emulation is to send as many native applications as possible through the binary translation product, or emulator, and then verify that the outputs produced by the binary translation product are identical to corresponding outputs produced by the native applications running on the native platform. This conventional approach has several disadvantages. First, the binary translation product designer cannot know whether testing is complete because the native applications are usually compiler-generated and the machine code generated by the binary translation product only includes a subset of the instruction set architecture. Machine instructions that are not in this subset will never be generated in the compiler so that some binary instructions are never tested through the emulation process. Second, running an application through the binary translation product on the target platform and running the same application through the native platform is cumbersome. A separate process may then be needed to verify the results. Third, when an error is detected, pinpointing the exact machine instruction that caused the error may be difficult or impossible. In addition, replication of the emulation error may be impossible to achieve. Fourth, execution of some applications is time- or system-sensitive such that the result of an execution may not be reproducible, which adds to the difficulty ov verifying binary emulation.

SUMMARY

A method and an apparatus allows complete and efficient verification of cross-architecture ISA emulation. A random verification framework runs concurrently on two different computer architectures. The framework operates without regard to existing native applications and relies instead on binary instructions in a native ISA. The framework is able to determine emulation errors at a machine instruction level. The emulation errors are then easily identifiable and reproducible.

A random code generator generates one or more sequences of native machine instructions and corresponding initial machine states in a pseudo-random fashion. The native instructions are generated from an entire set of the native ISA. The instructions and the state information are provided to initialize a native computer architecture. The same instructions and state information are provided using standard machine-to-machine languages, such as TCP/IP, for example, to a target computer architecture. The target computer architecture may be embodied as an actual hardware device, or may be a simulation of a yet-to-be-built computer architecture. The target computer architecture includes a binary emulator that translates the native instructions into binary instructions executable on the target computer architecture. The final states of the native and the target computer architectures are gathered, and a verification engine compares the results. Any differences may indicate an emulation error or failure.

The pseudo-random verification framework may be run continuously to test emulation of the complete set of instructions from the native ISA. Even the least-used machine instructions are tested by the framework. Further, the framework automates the emulation verification process. Inter-machine communications allow the native and the target computer architectures to process the same machine instructions from the same initial states. Any inconsistencies in the final produced states indicate the emulation error. The framework can then easily pinpoint the exact machine instruction, register number and input machine state that caused the emulation error, thereby significantly reducing the amount of time required for debugging. Finally, the emulation errors detected using this framework are easily reproducible.

DESCRIPTION OF THE DRAWINGS

The detailed description will refer to the following drawings, in which like numerals refer to like objects, and in which.

DETAILED DESCRIPTION

A method and an apparatus allow complete and efficient verification of cross-architecture ISA emulation. A random verification framework runs concurrently on two different computer architectures. The framework is able to determine emulation errors at a machine instruction level. The emulation errors are then easily identifiable and reproducible.

Figure 1:
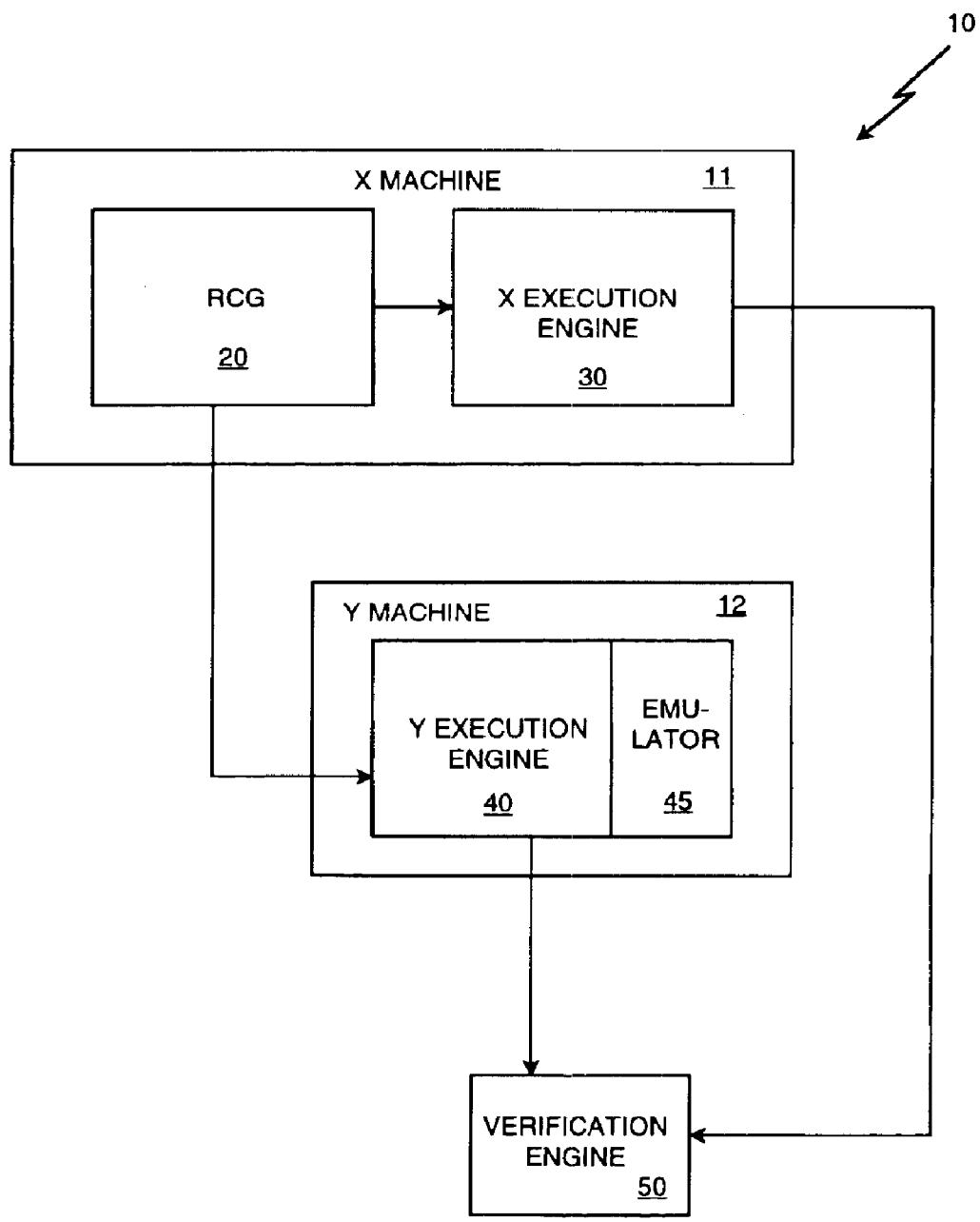
FIG. 1 is a block diagram of an example of an apparatus for validating cross-architecture ISA emulation.

FIG. 1 is a block diagram of an embodiment of an apparatus for validating cross-architecture instruction set architecture (ISA) emulation. A framework 10 includes a random code generator (RCG) 20 that generates native machine instruction level code and an initial machine state. The machine instruction level code (i.e., sequences of binary instructions) and initial machine state are provided to a native ISA platform 11, which includes a first, or X, execution engine 30. The X execution engine 30 is capable of executing the instruction level code without emulation or translation.

The RCG 20 may include a probability file that is used to pseudo-randomly generate the machine instruction level code. The RCG 20 also provides the machine instruction level code and the initial machine state to a non-native ISA or target platform 12, which includes a second, or Y, execution engine 40. To execute the machine instruction level code, the Y execution engine 40 emulates or translates the machine instruction level code using an emulator 45.

In an alternative embodiment, the emulator 45 may operate on a target platform simulator (not shown), which in turn operates on the native platform 11.

The X execution engine 30 and the Y execution engine 40 may execute the same machine instruction level code concurrently. The execution engines may perform information transfer using any standard machine-to-machine protocol, such as TCP/IP, for example.

The X execution engine 30 and the Y execution engine 40 each will provide a final machine state. The final machine states are sent to a verification engine 50. The verification engine 50 compares the final machine states to determine any differences. Such differences may indicate an error in emulation of the native machine instruction level code. In particular, the verification engine 50 is able to pinpoint the exact machine instruction, register number and input machine state that caused the emulation error. The exact source of the emulation error may be particularly easy to locate because the instruction sequence that generated such an emulation error is typically a short sequence of binary instructions. Hence, a review of information saved when an emulation failure occurs allows the test designer to quickly pinpoint the exact cause of the emulation failure.

In an example, if a binary instruction to be emulated comprised ADD R1 and R2, R3, the verification engine 50 would determine if the result written to the register R3 using the emulator 45 and the Y execution engine 40 was the same as that written to the register R3 using the X execution engine 30. As long as the final state produced by the X execution engine 30 is the same as the final state produced by the Y execution engine 40, the emulation of the binary instruction with a given specific initial machine state was correct.

The framework 10 relies on pseudo-random generation of machine level instructions to comprehensively test the correct emulation of native applications on a second computer architecture. The machine level instructions may be generated according to many different pseudo-random generation schemes. In an embodiment, each machine level instruction is assigned a probability. In particular, a specific instruction to be generated is controlled by an input probability file, which is a list of pre-defined machine instructions, each with an associated probability. The machine instructions are arranged in a hierarchy form and divided into segments based on a function of the instruction. A first such segmentation may include CPU instructions, which include floating instructions. Continuing, the CPU instructions may be further segmented according to arithmetic/logic, immediate, memory, system, memory management, and branch instructions, and other CPU instructions. The arithmetic/logic instructions may be segmented into ADD, SUB, AND, OR, and XOR instructions, and other arithmetic/logic instructions, for example. Each hierarchical instruction is assigned a probability such that a cumulative probability along any hierarchical path equals 1.00.

The instruction sequence generation process is pseudo-random because any random code generator must operate according to a pre-determined algorithm. Further limitations also lead to a loss of true randomness. For example, certain memory regions may be inaccessible to the random code generator.

An example probability file that controls the pseudo random instruction generation follows. In the example, expressions such as pr_xxx refer to a probability value for binary instruction xxx.

The instructions are arranged in hierarchical segments.

| | |
|---|---|
| pr_cpu | = 1.00 |
| pr_fp | = 0.00 |
| pr_cpu | = 1.00 |
| pr_cpu_arithlog | = 0.25 |
| pr_cpu_immediate | = 0.25 |
| pr_cpu_shexdet | = 0.00 |
| pr_cpu_mem | = 0.50 |
| . | |
| . | |
| . | |
| pr_cpu_arithlog | = 0.25 |
| pr_add | = 0.04 |
| pr_add1 | = 0.04 |
| . | |
| . | |
| . | |
| pr_sub | = 0.04 |
| pr_subb | = 0.04 |
| pr_cpu_immediate | = 0.25 |
| pr_ldo | = 0.15 |
| . | |
| . | |
| . | |
| pr_subi | = 0.10 |
| . | |
| . | |
| . | |

Beginning at any node, the sum of probabilities of the immediate exiting branches (or paths) is 1.0. For example, beginning at the CPU node, the nonzero exiting branches are 0.25 +0.25+0.5=1.0. Further, the probability of any specific machine instruction is the product of the probabilities of taking each branch that leads to said specific machine instruction. Note that the sum of the probabilities of all specific machine instructions should equal 1.0.

With the above-assigned probabilities, the RCG 20 will never select a floating point (fp) instruction (i.e., pr_fp= 0.00). Note that the cumulative probability of the first segment is 1.00. That is, pr_cpu and pr_fp sum to 1.00. This cumulative probability rule is maintained throughout the probability file.

By assigning higher probability values to some instructions and lower probability values to other instructions, the test designer can ensure that all binary instructions are eventually tested after the testing continues for an infinite length of time.

The RCG 20 begins with a seed value and then determines a pseudo random probability value.

The RCG 20 begins with a seed value and then determines a pseudo random probability value. For example, a seed value of 10 may produce a probability sequence of 0.34, 0.8, . . . Using the cumulative probability in the above example, a random probability of 0.34 would lead the RCG 20 to generate a cpu_immediate instruction, and a random probability of 0.8 would lead the RCG 20 to generate a pr_cpu_immediate_subi instruction.

Figure 2:
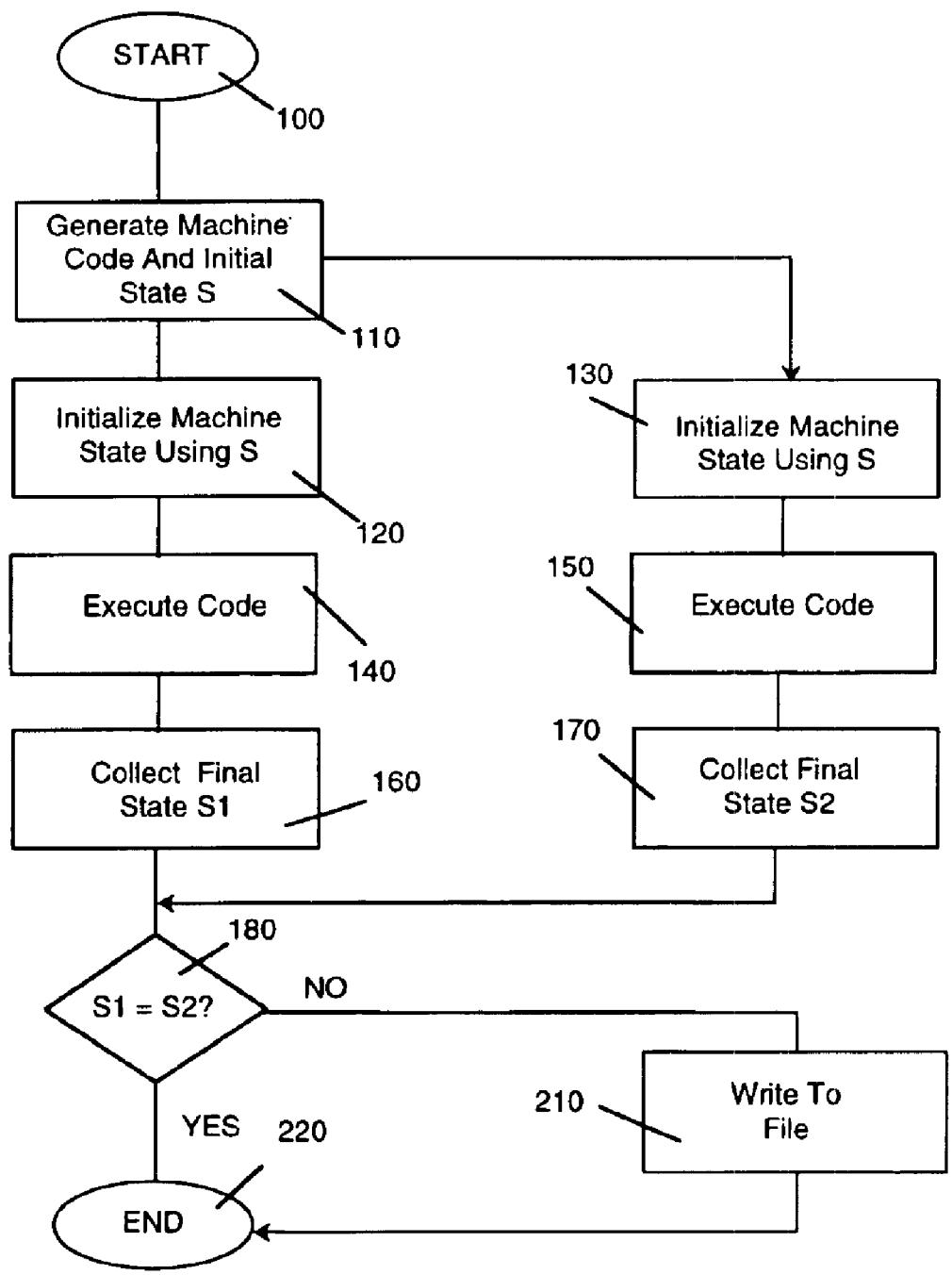
FIG. 2 is a flowchart illustrating an operation of the apparatus of FIG. 1.

FIG. 2 is a flowchart of a process that may be used by the framework 10 of FIG. 1. The process includes a main process and sub-processes A and B. Sub-process A operates on the native platform 11 and the X execution engine 30. Sub-process B may operate in one of at least two ways. First, sub-process B may operate on the binary emulator 45, which may in turn operate on the target platform 12. Second, sub-process B may operate on the binary emulator 45, but the binary emulator 45 may operate on a target platform simulator. The target platform simulator may then operate on the native platform 11.

The main process begins at 100. In code generate block 110, the RCG 20 generates pseudo-random native machine code and generates a pseudo-random initial machine state. The native machine code and the initial machine state are provided to the native platform 11, and the native platform 11 is initialized using the initial machine state, block 120. The same native machine code and initial machine state are also provided to the target platform 12, and the target platform 12 is initialized, block 130. The native machine code and initial machine state may be provided to the target platform 12 using TCP/IP protocols, for example.

In block 140, the X execution engine 30 executes the native machine code. Concurrently, the binary emulator 45 emulates the entire Y execution engine 40, which internally executes the native machine code, block 150. Next, a final machine state S1 is collected in the native platform 11, block 160, and a final machine state S2 is collected in the target platform 12, block 170.

In block 180, the target platform 12 provides the final machine state S2 to the verification engine 50, using TCP/IP protocols, for example. The verification engine 50 compares the final machine states S1 and S2. If the final machine states S1 and S2 are equal, the process moves to block 220 and ends. If the final machine states S1 and S2 are not equal, the process moves to block 210, and information related to the emulation failure (i.e., the initial and final states, and the instruction sequence) are written to a file. The process then moves to block 220 and ends.

The test designer then need only refer to the file to determine the source of the emulation failure, and to reproduce such emulation failure.

The terms and descriptions used herein are set forth by way of illustration only and are not meant as limitations. Those skilled in the art will recognize that many variations are possible within the spirit and scope of the invention as defined in the following claims, and there equivalents, in which all terms are to be understood in their broadest possible sense unless otherwise indicated.

What is claimed is:

1. An apparatus for pseudo-random testing binary emulation, comprising:
    a random code generator capable of generating an initial machine state and a binary instruction sequence;
    a native architecture execution engine capable of executing the binary instruction sequence to produce a first final state;
    a target architecture execution engine capable of executing the binary instruction sequence concurrently with the native architecture execution engine to produce a second final state, the target architecture execution engine comprising a binary emulator capable of emulating the binary instruction sequence according to the target architecture; and
    a verification engine capable of comparing the first final state and the second final state, wherein when the first final state and the second final state do not match, an emulation failure has occurred, wherein the verification engine pinpoints an exact machine instruction, a register number, and an input machine state that caused the emulation failure;
    wherein an emulated binary instruction sequence that generates the emulation failure is a sequence of binary instructions, enabling the emulation failure to be determined at a machine instruction level.

2. The apparatus of claim 1, wherein the native and the target architecture execution engines communicate using machine-to-machine communications protocols.

3. The apparatus of claim 2, wherein the communications protocol is a TCP/IP protocol.

4. The apparatus of claim 1, wherein when the emulation failure occurs, information related to the emulation failure is written to a file.

5. The apparatus of claim 1, wherein the target platform is a hardware embodiment.

6. The apparatus of claim 1, wherein the random code generator comprises a probability file comprising probability values for each instruction in a native instructions set architecture (ISA).

7. The apparatus of claim 6, wherein the probability values in the probability file are user-generated.

8. A method for pseudo-random testing of binary emulation, comprising:
    generating a pseudo-random binary instruction sequence;
    generating an initial machine state;
    initializing a native machine according to the initial machine state;
    executing the binary instruction sequence on the native machine to produce a first final state;
    initializing a target machine according to the initial machine state;
    emulating the binary instruction sequence on the target machine;
    executing the emulated binary instruction sequence to produce a second final state concurrently with the step of executing the binary instruction sequence on the native machine;
    comparing the first final state and the second final state to determine an emulation error;
    enabling the emulation error to be determined at a machine instruction level; and
    pinpointing an exact machine instruction, a register number, and an input machine state that caused the emulation error.

9. The method of claim 8, further comprising:
    communicating the initial machine state and the binary instruction sequence to the target machine using a machine-to-machine communication protocol; and
    communicating the second final state to the native machine using the machine-to-machine communication protocol.

10. The method of claim 9, wherein the machine-to-machine communication protocol is a TCP/IP protocol.

11. The method of claim 8, further comprising storing information related to the emulation failure, the information comprising the initial machine state, the binary instruction sequence and the first and second final states.

12. The method of claim 8, wherein the binary emulation is executed on a simulator.

13. The method of claim 8, wherein the binary emulation is executed on a hardware device.

14. The method of claim 8, further comprising:
    assigning a probability value to each binary instruction in a native instruction set architecture (ISA);
    pseudo-randomly generating a probability value; and
    selecting the binary instruction sequence based on the probability value.

15. A method for verifying cross-architecture emulation, comprising:
    randomly generating a native instruction sequence and an initial machine state;
    providing the native instruction sequence and the initial machine state to a first platform having a first instruction set architecture (ISA);

providing the native instruction sequence to a second platform having a second ISA;

emulating the native instruction sequence according to the second ISA;

executing the native instruction sequence in the first platform, the execution providing a first final state;

executing the emulated native instruction sequence on the second platform, the execution providing a second final state concurrently with the step of executing the native instruction sequence;

comparing the first and second final states to determine an emulation failure;

enabling the emulation failure to be determined at a machine instruction level; and pinpointing an exact machine instruction, a register number, and an input machine state that caused the emulation failure.

16. The method of claim 15, wherein the native instruction sequence is randomly generated from a set of all instructions in the first ISA.

17. The method of claim 15, wherein the random generation is based on a user-defined value assigned to each instruction in the first ISA.

18. The method of claim 15, wherein the emulation is completed on a binary instruction emulator operating on the second platform.

19. A computer readable medium providing instructions for pseudo-random testing binary emulation, the instructions comprising:

generating an initial machine state and a binary instruction sequence;

executing the binary instruction sequence to produce a first final state;

executing the binary instruction sequence concurrently with the native architecture execution engine to produce a second final state;

emulating the binary instruction sequence according to the target architecture;

comparing the first final state and the second final state, wherein when the first final state and the second final state do not match, an emulation failure has occurred;

enabling the emulation failure to be determined at a machine instruction level; and pinpointing an exact machine instruction, a resister number, and an input machine state that caused the emulation failure.

* * * * *